July 1, 1969  J. KULAK  3,452,530

ROTARY CUTTER

Filed March 31, 1966

INVENTOR.
JOHN KULAK

BY

*John C. Thompson*

ATTORNEY

United States Patent Office 3,452,530
Patented July 1, 1969

3,452,530
ROTARY CUTTER
John Kulak, Port Colborne, Ontario, Canada, assignor to Deere & Company, Moline, Ill., a corporation of Delaware
Filed Mar. 31, 1966, Ser. No. 539,114
Int. Cl. A01d 49/00, 35/26, 75/30
U.S. Cl. 56—503
3 Claims

ABSTRACT OF THE DISCLOSURE

A rotary cutter having two rotors mounted in side-by-side relation for rotation in overlapping planes, a main gear box having an input shaft connected to a main drive shaft and having first and second output shafts operatively connected to the rotors through cross shafts, a slip clutch operatively connected between each cross shaft and the associated rotor, and each cross shaft including a retiming means to adjust to relative angular positions of the rotors should they move out of proper angular position due to slippage of the clutches.

---

This invention relates generally to agricultural implements and more particularly to rotary cutters having two rotors which are used primarily for cutting, shredding and disintegrating brush, crop stalks, and other growth, all of which is reduced to a mulch that conserves moisture, aids in clean plowing, and prevents soil erosion.

In prior art heavy-duty rotary cutters having two rotors it has been the general practice to drive the rotors from the power take-off of a tractor by means of a main drive shaft and two cross shafts which are driven through a centrally located gear box. It has also been customary to provide a slip clutch in the main drive shaft to prevent excessive damage to the blades of the rotor should they happen to strike an obstruction. While this design has prevented excessive damage to the rotors, it has not been entirely satisfactory because the cross shafts between the main gear box and the rotors tend to fail because of the carry-over of shock loads from one rotor to the other. Thus in a typical situation when one rotor strikes an obstruction inertial forces will be fed in by the free rotor through the gear box and add to the torque supplied by the tractor to cause failure of the shaft interconnecting the gear box with the rotor which is obstructed.

Therefore, it is the principal object of this invention to provide construction for heavy-duty rotory cutters having two rotors that will prevent failures of cross shafts should one of the rotors strike an obstruction.

More particularly it is an object of this invention to provide in a rotary cutter having two rotors driven through cross shafts from a centrally located gear box a slip clutch in one of the cross shafts and a second slip clutch in either the other cross shaft or in the main drive shaft.

A further object of this invention is to provide a retiming device for a rotary cutter having two cross shafts, whereby the position of one of the rotors may be changed with respect to the other rotor position.

These and other objects and advantages of this invention will be apparent to those skilled in the art after a consideration of the following detailed description, taken in conjunction with the accompanying drawings in which the preferred form of this invention is illustrated.

In the following description right-hand and left-hand reference is determined by standing to the rear of the rotary cutter and facing the direction of travel.

Figure 1:
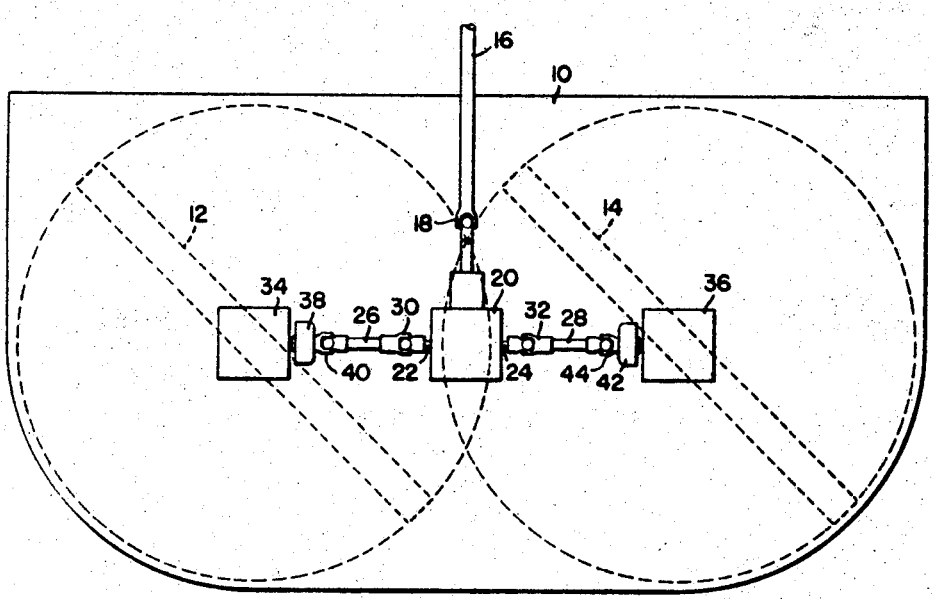
FIG. 1 is a plan view of a heavy-duty rotary cutter employing two rotors in which the principles of this invention have been incorporated.

Referring first to FIG. 1, the principles of the present invention have been incorporated in a rotary cutter having a normally horizontally disposed rotor housing 10 which serves as a main frame and to which left and right rotors 12 and 14 are rotatably secured. In operation the rotary cutter is secured to a farm tractor in any conventional manner, and the rotors are driven by power delivered thereto by a conventional main power shaft 16 which is connected in any suitable way to the power take-off shaft of the tractor (not shown). The power shaft 16 is in turn connected through a universal joint 18 to the input of a centrally disposed bevel gear housing 20 which is mounted on the rotor housing 10.

The main gear box 20 is provided with left and right output shafts 22, 24 to which left and right cross shafts 26, 28 are connected by means of left and right universal joints 30, 32. The left and right rotors 12, 14 are supported on vertically extending spindles (not illustrated) which extend downwardly from left and right gear housings 34, 36, each of these gear housings having an input side which is interconnected with the cross shafts 26, 28.

In the embodiment illustrated in FIG. 1 the input shaft for the left gear housing 34 is driven through a slip clutch 38, the drive side of the slip clutch being connected with the left cross shaft 26 by means of a universal joint 40. A second slip clutch 42 is disposed between the right cross shaft 28 and the input of the right gear housing 36, this slip clutch also being interconnected with the cross shaft 28 by means of a universal joint 44.

Figure 2:
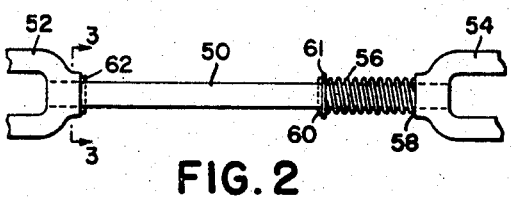
FIG. 2 is an enlarged view of a cross shaft usable in the rotary cutter illustrated in FIG. 1.
Figure 3:
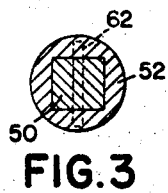
FIG. 3 is a sectional view taken along the line 3—3 in FIG. 2.

As can be seen from FIG. 1 the cutter bars 12 and 14 overlap. Slippage of the clutches during operation will eventually result in the rotors 12 and 14 becoming untimed so that they will strike each other during rotation. A quick retiming means as illustrated in FIG. 2 is usable in lieu of the cross shafts 26, 28 to facilitate retiming the rotors so that they no longer interfere with each other. The retiming device consists essentially of a shaft 50 which is square in cross section, one end of the shaft 50 being received within a corresponding aperture in one end of a yoke 52 of an associated universal joint which will replace one of the universal joints 30, 32, the other end of the shaft 50 also being slidably disposed within a yoke 54 of an associated universal joint which will replace one of the universal joints 40, 44. A spring 56 is disposed about the shaft 50 and biases the shaft 50 towards the yoke 52, one end of the spring bearing against the abutting surface 58 of the yoke 54 and the other end being held in place by means of a roll pin 60 and washer 61. Movement of the shaft 50 towards the yoke 52 is limited by a pin 62 which engages the corresponding abutting surface of the yoke 52. To rotate the rotor it is only necessary to slide the shaft 50 towards the yoke 54, thereby disengaging the end disposed within the yoke 52 to swing the shaft 50 to a position at right angles to its normal center line, and then to rotate the rotor through by hand, and then to reinsert the end of the shaft 50 back into the yoke 52. While only one retiming means is necessary, both cross shafts could be replaced by the retiming devices so there would be common parts for the two rotors.

What is claimed is:

1. A rotary cutter comprising: a normally horizontally disposed rotor housing connectible to a tractor having a power take-off for advance over the ground; a main drive shaft attachable to and drivable by the tractor power take-off; a main gear box mounted on said housing and having an input element connected to the main drive shaft and first and second output elements; first and second cutter rotors rotatably carried by the housing; first and second power transmitting means respectively interconnecting said first and second rotors with said first and second output elements; and first and second slip clutches respectively disposed in said first and second power transmitting means and adapted to slip when the torque transmitted through the respective power transmitting means exceeds a predetermined value.

2. The invention defined in claim 1 wherein at least one of said power transmitting means includes a manually actuatable retiming means operative to permit manual adjustment of the power transmitting means to adjust the angular position of the rotor connected thereto relative to the other rotor.

3. The invention defined in claim 2 wherein said retiming means comprises a pair of coaxially rotatable members disposed in the power transmitting means, at least one of said members having an axially extending aperture with a regular polygonal cross section; a shaft having a first end portion with a regular polygonal cross section corresponding to said aperture, and having its other end drivingly connected to the other of said members, the shaft being axially shiftable between a first position wherein said first end portion is disposed within said aperture to drivingly connect the shaft to said one member and a second position wherein the end portion is withdrawn from the aperture to permit relative rotation of the two members; and spring means operative between the shaft and one of said members to bias the shaft toward its first position.

References Cited
UNITED STATES PATENTS

| | | | |
|---|---|---|---|
| 970,793 | 9/1910 | Carlson | 64—24 |
| 1,245,168 | 11/1917 | Wright. | |
| 1,631,236 | 6/1927 | Werner | 64—23 X |
| 3,121,302 | 2/1964 | Northcote et al. | 56—503 X |

FOREIGN PATENTS 130,933   8/1919   Great Britain.

LUCIE H. LAUDENSLAGER, *Primary Examiner.*

U.S. Cl. X.R.

56—6, 254; 64—24